(12) United States Patent
Feldman et al.

(10) Patent No.: US 6,457,307 B1
(45) Date of Patent: Oct. 1, 2002

(54) HYDROSTATIC WAVE ENERGY CONVERSION SYSTEM

(76) Inventors: Yosef Feldman, 7, Genesin Str., Tel Aviv, 63564 (IL); Emanuel Mendes, 16, HaOranim Str., Petach-Tikva 49213 (IL)

(*) Notice: Subject to any disclaimer, the term of this patent is extended or adjusted under 35 U.S.C. 154(b) by 0 days.

(21) Appl. No.: 09/719,201
(22) PCT Filed: Jun. 13, 1999
(86) PCT No.: PCT/IL99/00314
§ 371 (c)(1),
(2), (4) Date: Dec. 11, 2000
(87) PCT Pub. No.: WO99/66198
PCT Pub. Date: Dec. 23, 1999

(30) Foreign Application Priority Data

Jun. 14, 1998 (IL) .................................. 124902

(51) Int. Cl.⁷ .............................................. F16D 31/02
(52) U.S. Cl. ........................................ 60/398; 417/330
(58) Field of Search .................. 60/398, 496; 417/330; 290/42, 53

(56) References Cited

U.S. PATENT DOCUMENTS

| 3,307,827 A | 3/1967 | Silvers |
| 4,203,294 A | 5/1980 | Budal |
| 4,222,238 A | 9/1980 | McCulloch |
| 4,277,690 A | 7/1981 | Noren |
| 4,976,591 A | 12/1990 | Rivas |
| 6,256,985 B1 * | 7/2001 | Gardner et al. ............... 60/398 |

* cited by examiner

Primary Examiner—F. Daniel Lopez
(74) Attorney, Agent, or Firm—Ostrolenk, Faber, Gerb & Soffen, LLP

(57) ABSTRACT

A system for conversion of hydrostatic pressure variations of sea waves into useful energy is disclosed. The system is comprised of a sealed casing (12) with a membrane-like cover (16). The cover operates piston (52) under the pressure of the waves. The piston compresses air into vessel (22), from which it is discharged (86) to drive turbine (24) and produce electric energy (26). The piston (52) is recoiled back upwards by second piston (56), reciprocable within cylinder 58. The effective volume of the cylinder 58 is variable for counter-pressure adjustment purposes.

14 Claims, 2 Drawing Sheets

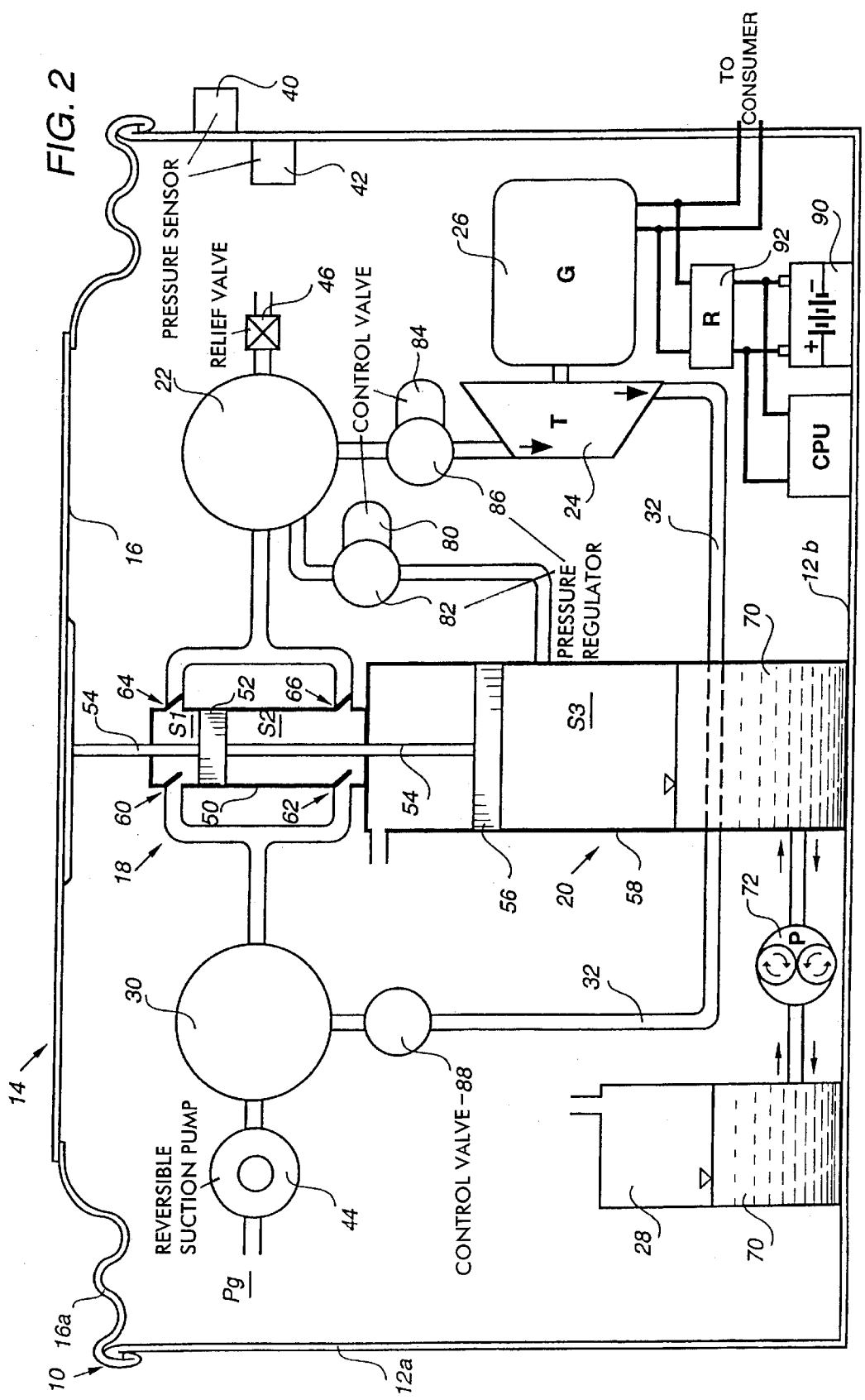

HYDROSTATIC WAVE ENERGY CONVERSION SYSTEM

BACKGROUND OF THE INVENTION

The present invention relates to systems for converting the energy of sea waves into useful energy.

Most of the state-of-the-art systems proposed and developed for the objective in question were designed for the exploitation of the kinetic energy of sea surf waves; all of these have failed due to technical and other reasons.

It is the object of the present invention to provide an off-shore, submerged energy generator utilizing the differential hydrostatic pressure prevailing between peaks and valleys of sea waves.

It is a further object of the invention that the generator be self-contained, i.e. working in closed cycles, without any external intervention, servicing, controls, etc.

SUMMARY OF THE INVENTION

Thus provided according to the present invention there is a system for the conversion of hydrostatic pressure variations such as generated by off-shore sea waves, into useful energy, comprising a casing hermetically sealed and submerged in the sea underneath the waves level, at least one wall of the casing being adapted to become displaced inwards and outwards of the casing under variable hydrostatic pressure applied thereon, a cylinder-and-piston system, ("the first system") the piston being coupled to the said one wall to move in unison therewith, valve means associated with the first system so that on every stroke of the piston a quantity of a fluid supplied to the cylinder is compressed out of the cylinder into a pressurized fluid vessel and means for converting the energy of the pressurized fluid stored in the pressurized fluid vessel into useful energy.

Preferably the system further comprises a second cylinder-and-piston system ("the second system"), the piston thereof being coupled to the piston of the first system to move in unison therewith and means for controllably varying the effective volume of the cylinder of the second system.

The effective volume varying means may comprise a source of a liquid and means for introducing/evacuating the liquid into/from the said cylinder.

Further means may be provided for increasing the initial pressure in the said effective volume space.

BRIEF DESCRIPTION OF THE DRAWINGS

These and additional objects, advantages and constructional features of the invention will become more clearly understood in the light of the ensuing description of a preferred embodiment thereof, given by way of example only, with reference to the accompanying drawings, wherein:

FIG. 2 is a schematic representation of the system.

DETAILED DESCRIPTION OF THE PREFERRED EMBODIMENT

Figure 1:
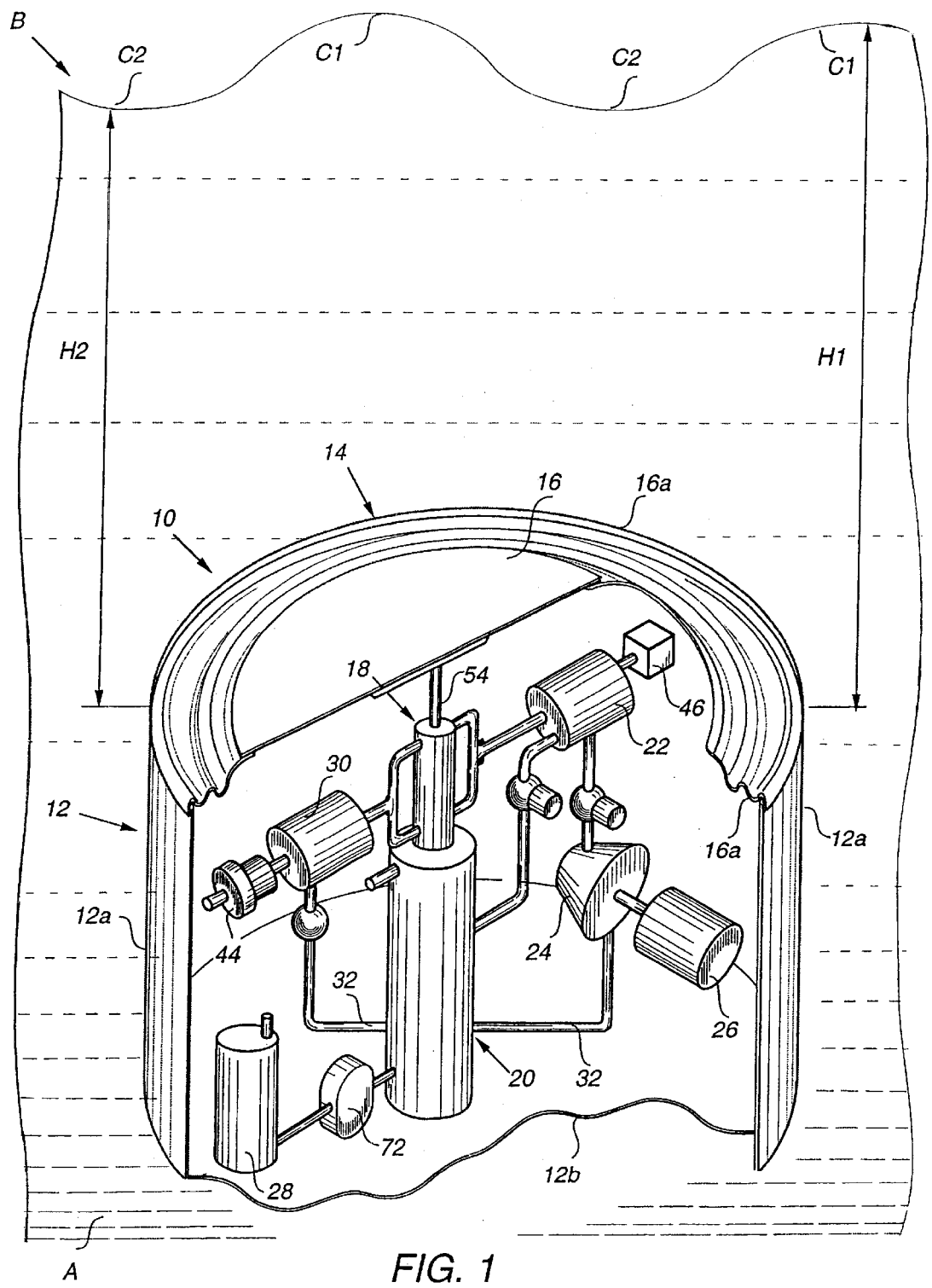
FIG. 1 is a schematic view illustrating the underwater working location of the system and some of its sub-systems.

Shown in FIG. 1 is a portion of a sea body of water, between bottom A and surface B, waves C, forming peaks C1 and valleys C2. It is the deferential hydrostatic pressure prevailing near the bottom A (or anywhere else below the surface B), namely the head balance (H1–H2) that is harnessed to produce useful energy according to the principles to be explained below.

The energy generator generally denoted 10, is comprised of a barrel-shaped casing 12, with circular side wall 12a, bottom 12b and cover 14.

The generator 10 is self-contained in the sense that it works in a closed loop and need not to cooperate with any other system; the functions of certain sub-systems are automatically controlled by feedback from relating other subsystems, as will be seen later on. This stand-alone feature of the generator is regarded as one of the uniques of the present invention.

Furthermore, the generator 10 need not to rest on the sea bottom A, but can be held in buoyancy thereabove using suitable anchoring means (not shown).

As further schematically seen in FIG. 1 the cover 14 of the casing 12 is made as a membrane 16, namely a rigid plate connected to the side wall 12a of the casing 12 intermediate a yeildable sheet 16a, thus allowing the displacement of the plate 16a up and down following changes in the differential pressures applied thereto (between the interior and the outer pressures as will be explained in detail below).

The general sub-systems of the generator 10 will be now identified for better understanding of the more detailed description given in conjunction with FIG. 2; these include:

First cylinder-and-piston assembly or system 18;

Second cylinder-and-piston system 20;

Pressurized fluid (air) accumulating vessel 22;

Turbine 24 drivingly coupled to electrical power generator 26;

Liquid supply source 28 for varying the volume of the cylinder of system 20; and Interim fluid (air) supply vessel 30, for supplying the cylinder of system 18, and connected via conduit 32 to turbine 24 discharge port, thus closing the working loop of the fluid.

Referring now for more details to FIG. 2, it should be first noted that in order to function properly, the pressure prevailing within the casing 12 of the generator 10, denoted Pg, must always be kept less than the minimum hydrostatic pressure applied by the waves B. namely under the water head H2; otherwise, the membrane cover 16 will not respond to the differential pressure (H1–H2), i.e. become displaced up and down as desired.

Therefore, outer pressure gauge 40 and inner pressure gauge 42 are provided for constantly measuring these pressures, and to govern the operation of an electrically operated, reversible suction pump 44 for lowering the internal pressure; relief valve 46 is associated with the high pressure vessel 22 for increasing the internal pressure, as the case may be.

A central computerized unit CPU is included, which controls the various operational parameters of the generator sub-systems as will be explained below.

The first cylinder-and-piston system 18 comprises cylinder 50 and piston 52 with piston rod 54, which extends upwards where it is rigidly connected to the plate 16, as well as downwards out of the cylinder 50, where it becomes the rod of piston 56 of the second cylinder-and-piston system 20, provided with cylinder 58. Thus defined are upper and lower effective spaces denoted S1 and S2.

The system 18 acts as a double-stroke air pump, compressing air supplied from vessel 30 to vessel 22. There are provided two unidirectional inlets 60, 62 connected to the vessel 30 on the one hand, and two unidirectional outlets 64, 66, leading to the vessel 22, as shown. Reciprocation of the piston 52 in either direction will therefore pressurize air into the vessel 22.

Referring to the second cylinder-and-piston system 20, it will be noted that the stroke of the piston 52 is opposed by that of the piston 56, both being mounted to a common rod 54.

The cylinder 58 is of a variable effective volume (space S3), achieved by filling it partly, to a controlled amount, with liquid 70, such as oil, through pump 72 from container 28.

The variable space S3 within the cylinder 58 underneath the piston 56 is also adapted to be charged with predetermined, variable pressure to be supplied from pressurized air vessel 22 via control valve 80 and pressure regulator 82.

The turbine (or air motor) 24 is operated by the pressurized air stored in vessel 22, via control valve 84 and pressure regulator 86.

As already explained, the discharge port of the turbine 24 is connected by conduit 32 and control valve 88 to the interim air supply vessel 30.

Finally, a rechargeable battery 90 recharged by the generator 26 (through voltage regulator 92) is included for supplying electric power to operate the CPU, the suction pump 44, the oil pump 72 and all the control valves and other devices as apparent from the foregoing description.

The operation of the generator 10 proceeds as follows. As already mentioned, the internal pressures Pg is pre-set and maintained to a value less to a certain extent, than the value of the external hydrostatic pressure to which the membrane cover 16 is subjected. Otherwise, should the internal pressure exceed the external pressure, the membrane cover would not respond to, i.e. become displaced downwards under the external pressure represented by the water head H1; and if the internal pressure is too low, again the membrane 16 will not function, but remain stationary at its lowermost position, irrespective of a reduced water head H2.

Regulation of the pressures is maintained by the suction pump 44, or the relief valve 46 (controlled by pressure gauges 40, 42), in accordance with the actual working conditions, taking into account, among other parameters, the height of the sea waves B at any given time.

Supposing that the internal pressure has been properly adjusted, the piston 52 is at its uppermost position, and the generator is first subjected to the increased hydrostatic pressure proportional to a wave peak C1, then, under such elevated pressure the membrane cover 10 will descend. The piston will move down and a quantity of air (space S2) will be compressed into the vessel 22.

Simultaneously, a pressure will be built-up in the space S3. This counter-pressure is essential in order to achieve the upwards stroke of the piston 52 along with the lifting of the membrane cover 16, after the wave peak C1 has passed away and a lower hydrostatic pressure, related to head H2, prevails.

The appropriate adjustment of the counter pressure, which is of major importance for starting and maintaining the cyclic operation of the unit, is achieved by adjusting at least one of the following variants: Changing the effective volume S3, and/or charging extra pressure thereinto. The first variant is accomplished in the present example by the filling/evacuating the oil 70 into/out of the lower part of the cylinder 58; and the second variant is adjusted by partly directing compressed air from the vessel 22, though pressure regulated valve 82 into the space S3.

The combination of the two variants, each being individually controllable by the CPU, along with suitable calculation of the area of the piston 56 relative to that of the piston 52 ensure the availability of a wide range of changeable factors required for achieving the desired result, namely, effectively, lifting the piston 56 when a relative relief of force is sensed by the membrane 16, caused by the decreased hydrostatic pressure H2, with minimum loss of energy.

As the compression cycles continue, the pressure will be built-up within the vessel 22. Upon reaching a level sufficiently high, pressure regulator 86, by a command of the CPU, will open and the compressed air will drive the turbine 24 for as long as the pressure remains effective for that purpose. Again controlled by the CPU, the valve 84 will close and a new cycle will be started.

Low pressure air is directed through conduit 32 from the outlet port of the turbine 24 to the vessel 30, and therefrom to the cylinder 50. The air is therefore recycled in a closed working loop (except for a portion either expelled from the relief valve 46, or sucked by suction pump 44—as already mentioned above).

It goes without saying that a plurality of generators as herein described, are readily adapted to work in parallel, thus compensating for the inherent operating pauses of each one of them.

Once installed, no maintenance or servicing is requested for a long period (say, for replacing the batteries 90). It is thus suitable for use along coasts of deserted areas, where the supply of conventionally produced electricity is too expensive.

Those skilled in the art will readily understand that various changes, modifications and variations may be applied to the invention as above exemplified without departing from the scope of the invention as defined in and by the appended claims.

What is claimed is:

1. A system for conversion of hydrostatic pressure variations generated by off-shore sea waves, into useful energy, comprising:
    a casing hermetically sealed and submerged in the sea underneath the waves level;
    means for generating a sub-pressure within the casing;
    at least one wall of the casing being adapted to become displaced inwards and outwards of the casing under variable hydrostatic pressure applied thereon;
    a first cylinder-and-piston system having a piston coupled to the said one wall to move in unison therewith;
    valve means associated with the first system so that on every stroke of the piston a quantity of a fluid supplied to the cylinder of the first system is compressed out of the cylinder into a pressurized fluid vessel;
    a second cylinder-and-piston system having a piston rigidly coupled to the piston of the first system to move in unison therewith;
    means for controllably varying the effective volume of the cylinder of the second system in relation with the force applied by said one wall on the piston of the first system; and
    means for converting the energy of the pressurized fluid stored in the pressurized fluid vessel into useful energy.

2. The system of claim 1 wherein the volume varying means comprise a source of a liquid and means for introducing/evacuating the liquid into/from the cylinder of the second system.

3. The system of claim 2 wherein means are provided for controlling the introduction/evacuation of the liquid as a function of hydrostatic pressure variations.

4. The system of claim 3 wherein said source of liquid comprise a reservoir of the liquid in communication with the cylinder of the second system, and said liquid introduction/evacuation means comprises an electric reversible pump controlling the flow of the liquid into/from said cylinder of said second system.

5. The system of claim 1 wherein said means for controllably varying the effective volume of the cylinder of said second system comprising means for increasing the initial pressure in the said effective volume.

6. The system of claim 5 wherein the increased pressure is supplied from the pressurized fluid vessel.

7. The system of claim 1 wherein the energy converting means comprise a turbine drivingly coupled to an electric generator.

8. The system of claim 7 further comprising conduit means connected between the outlet of the turbine and the inlet of the cylinder of the first system.

9. The system of claim 8 wherein said means for generating a sub-pressure within said casing comprising fluid suction means for lowering the pressure prevailing within the casing.

10. The system of claim 9 wherein said means for generating a sub-pressure within said casing comprising means for increasing the pressure prevailing within tie casing.

11. The system of claim 10 further comprising means for measuring the pressure prevailing within the casing, and means for controlling the pressure by setting into operation one or the other of the fluid suction means or the pressure increasing means.

12. The system of claim 11 comprising computerized control means for operating said one or the other means, for adjusting the pressure within the casing relative to a pre-determined pressure.

13. The system of claim 12 wherein the pre-determined pressure is set as a function the hydrostatic pressure to which the casing is subjected.

14. The system of claim 13 comprising an electric rechargeable battery supplied by the electric generator.

* * * * *